(12) United States Patent
Ho et al.

(10) Patent No.: US 6,476,879 B1
(45) Date of Patent: Nov. 5, 2002

(54) DIRECT DRIVE LCD RETRACTOR

(75) Inventors: Chung Lin Ho, Arcadia, CA (US); John W. Hubbs, Brea, CA (US)

(73) Assignee: Airshow, Inc., Tustin, CA (US)

( * ) Notice: Subject to any disclaimer, the term of this patent is extended or adjusted under 35 U.S.C. 154(b) by 44 days.

(21) Appl. No.: 09/597,903

(22) Filed: Jun. 19, 2000

(51) Int. Cl.$^7$ ................................. H04H 5/64
(52) U.S. Cl. ................... 348/837; 348/836; 312/319.6; 312/7.2
(58) Field of Search ................. 348/836, 837; 312/7.2, 223.3, 223.1, 319.6; 296/37.7, 37.8; 179/3.86

(56) References Cited

U.S. PATENT DOCUMENTS

| | | | |
|---|---|---|---|
| 4,008,422 A | 2/1977 | Sodekoda et al. | |
| 4,338,536 A | 7/1982 | Hallidy | |
| 4,385,205 A | * 5/1983 | Jacobson | ................... 179/6.03 |
| 4,409,848 A | 10/1983 | Lutz | |
| 4,504,751 A | 3/1985 | Meier | |
| 4,644,233 A | 2/1987 | Suzuki | |
| 4,748,387 A | 5/1988 | Tanuma et al. | |
| 5,096,271 A | 3/1992 | Portman | |
| 5,181,771 A | 1/1993 | Robak et al. | |
| 5,333,416 A | * 8/1994 | Harris et al. | ................... 312/7.2 |
| 5,467,106 A | 11/1995 | Salomon | |
| 5,511,832 A | 4/1996 | Kunzel | |
| 5,583,735 A | 12/1996 | Pease et al. | |
| 5,743,487 A | 4/1998 | Rice | |
| 5,946,055 A | * 8/1999 | Rosen | ......................... 348/837 |
| 6,373,216 B1 | 4/2002 | Ho | |

* cited by examiner

*Primary Examiner*—Lanna Mai
*Assistant Examiner*—Jerry A. Anderson
(74) *Attorney, Agent, or Firm*—Price and Gess

(57) ABSTRACT

A liquid crystal flat panel monitor is mounted in a frame that is positioned in an overhead compartment of an aircraft. A D.C. motor is mounted for pivoting the monitor. A voltage source having positive and negative polarity controls the D.C. monitor causing it to pivot the monitor to a viewing position or to a stowed position. The D.C. motor carries a flywheel on its shaft that stores energy as the motor rotates. During power loss, a controller sends a voltage pulse to the D.C. motor to spin it at high speed and store enough energy in the spring flywheel to pivot the monitor to a stowed position. A deployed position switch senses when the LCD monitor is fully rotated to its open view position. An electromagnetic latch keeps the LCD monitor locked in its stowed position until it is to be displayed for viewing.

18 Claims, 4 Drawing Sheets

DIRECT DRIVE LCD RETRACTOR

BACKGROUND OF THE INVENTION

1. Field of the Invention

The present invention relates generally to improvements in retractable flat panel monitors particularly of the type intended for overhead passenger use in commercial aircraft.

2. Description of Related Art

In the field of video monitors used in the passenger compartment of commercial aircraft, it has been the practice to employ full-size fixed CRT monitors or to utilize liquid crystal display monitors which pivot down from an overhead compartment, when in use, and at other times are retracted and stowed in an overhead compartment near the passenger seats. These monitors are dispersed throughout the passenger compartment of the aircraft. Typically, one monitor is provided for each two or three rows of seats. The monitors are typically stored in the overhead compartment with the LCD screen facing down or up. The monitors are typically pivotally mounted to a housing that is fixed in the overhead compartment of the aircraft or at some other desired location. A motor is attached to the housing. A power supply for both the motor and the housing is mounted to the housing. The motor is mechanically coupled to the monitor for pivoting it to an open position. Some prior art systems utilize a spring mechanism to return the monitor to its retracted stowed position. The spring mechanism is typically flexed when the monitor is pivoted to its open position. The energy stored in the spring is used to retract the monitor when desired. The coupling mechanism between the motor and the monitor is typically a compound pivot linkage or some other convenient linkage mechanism. Other video monitor deployment mechanisms are more mechanical. The monitor is moved in both directions by a spring drive rather than utilizing a motor to drive the monitor to an open position.

All these prior are devices rely on the energy stored in the spring to return the monitor to its closed or stowed position during normal power operation and in a power loss situation. The problem presented by these prior art systems is they tend to be bulky and the springs tend to be erratic in operation and need frequent replacement because of fatigue and abuse. The very tight quarters of these retractable monitors make servicing of the unit difficult and expensive. The present invention overcomes these problems by providing for the retraction of the monitor into its stowed position during power on and power off conditions without the use of any springs or systems that need frequent replacement, while taking very little space compared to the prior art.

SUMMARY OF THE INVENTION

A flat panel monitor is pivotally mounted in a frame that can be positioned in the overhead compartment of an aircraft. A motor is mounted to the pivoting flat panel monitor. A controller circuit with a supply of positive and negative power is mounted to the frame. The motor is mounted directly to the monitor with the shaft connected directly to the frame, or the motor is mounted directly to the frame with the shaft connected directly to the monitor. Either way, activation of the motor in one direction, by a voltage having a first polarity causes the monitor to pivot to an open position, and activating the motor in the other direction, by a voltage having a second polarity, causes the monitor to pivot to its closed position. The motor shaft carries a flywheel. Whenever the controller circuit senses a power failure, it causes a voltage pulse to be sent to the motor to spin it at high speed causing energy to be stored in the flywheel. When power is completely cut off during pivoting of the monitor to its stowed position, the spinning flywheel will bring the monitor back to its fully stowed position.

BRIEF DESCRIPTION OF THE DRAWINGS

The exact nature of this invention as well as its objects and advantages will become readily apparent upon consideration of the following detailed description when considered in conjunction with the accompanying drawings in which like reference numerals designate like parts throughout the figures thereof and wherein.

DETAILED DESCRIPTION OF THE PREFERRED EMBODIMENTS

Figure 1:
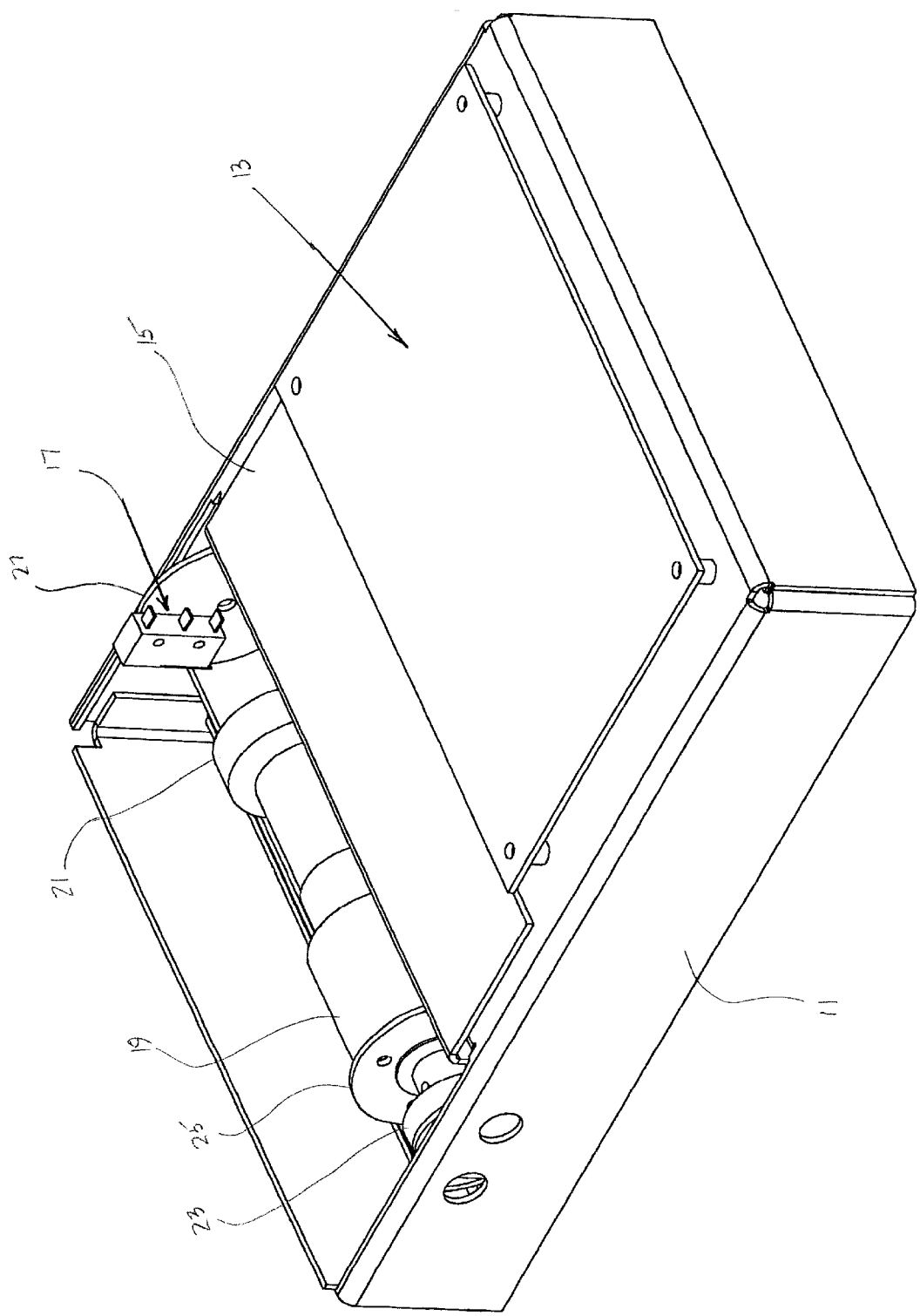
FIG. 1 is a prospective three dimensional view of the retractable flat panel display device according to the present invention.

FIG. 1 illustrates a prospective view of a retractable flat panel monitor such as an LCD monitor assembly that is particularly suited for use in commercial aircraft in a relatively small overhead compartment space. The main elements of the unit are a housing frame 11 which supports a controller circuit board 13, a motor mounting bracket 15 within which is mounted a D.C. motor 19 with reduction gears. One end of the shaft of D.C. motor 19 is coupled by a motor shaft coupler 23 to the housing of a flat panel monitor that is pivotally mounted to the frame 11. The motor 19 is fixedly mounted to a support 25 of motor mounting bracket 15. The other end of the shaft of motor 19 carries a flywheel 21 of a suitable size and construction. A support flange 27, which is part of the motor mounting bracket 15 carries a positioning switch 17 which is actuated by movement of the flat panel monitor.

Figure 2:
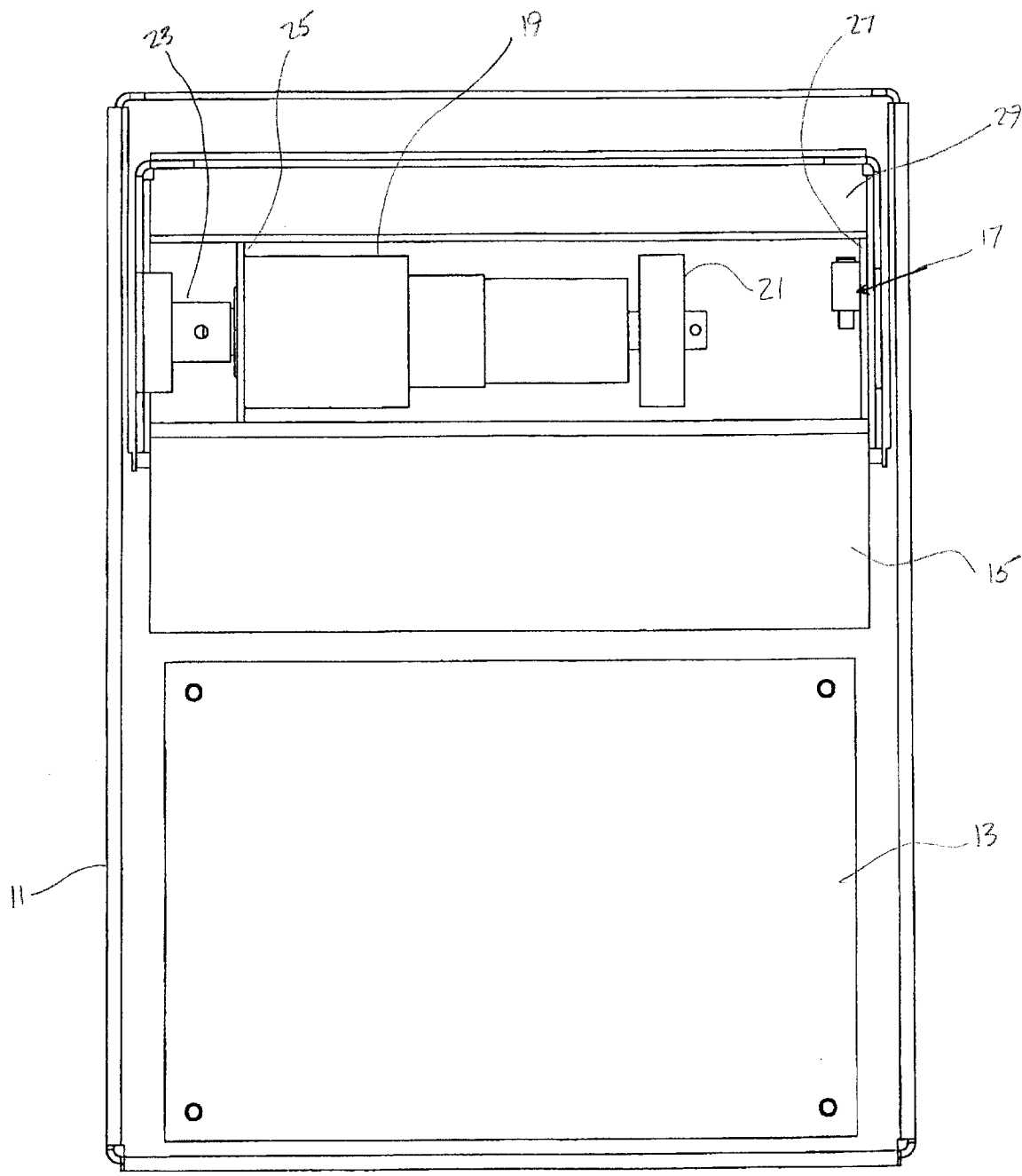
FIG. 2 is a top view plan of the display illustrated in FIG. 1.
Figure 3:
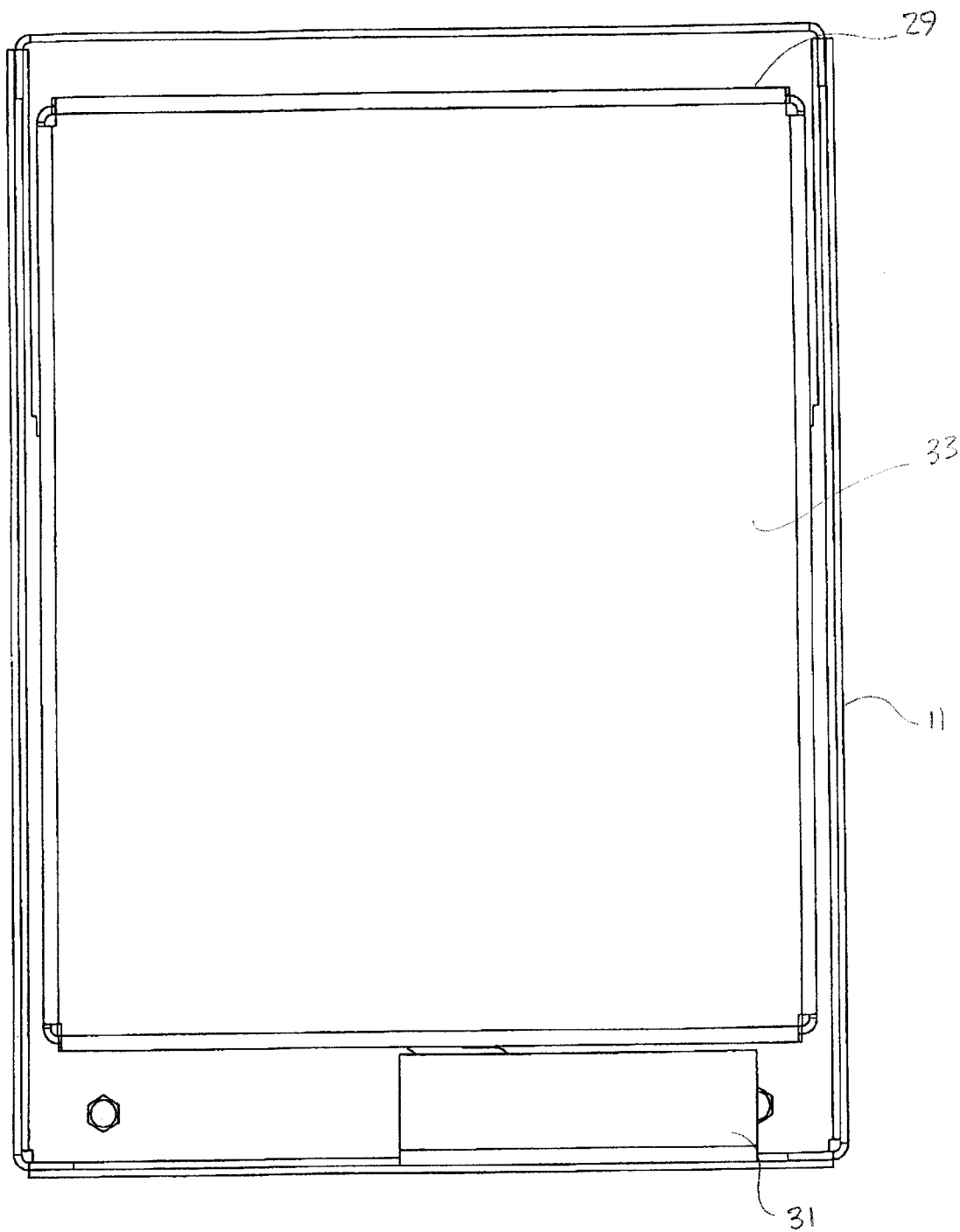
FIG. 3 is a bottom plane view of the device illustrated in FIG. 1.

Referring now to FIGS. 2 and 3, the position of the flat panel LCD monitor 29 is illustrated within the frame 11. The preferred embodiment illustrated shows the D.C. motor 19 mounted directly to the frame 11 by way of a support panel 25 which is part of the motor mounting bracket 15. The shaft is mounted directly to the LCD housing by the coupler 23. Thus, as the shaft turns, the LCD housing will pivot within frame 11 in a counter-clockwise (forward) or clockwise (backward) direction. The position switch 17 is mounted on a support 27 which is also part of the mounting bracket 15 to sense the position of the flat panel LCD monitor as it pivots to its fully deployed viewing position. An electromagnetic latch 31 is located on the frame on the underside or bottom of the frame 11 which is the side exposed to the passenger compartment when the flat panel monitor is in its stowed position. In its stowed position, as shown in FIG. 3, the LCD flat panel is contained within the frame on the inside of the flat panel monitor 29.

Figure 4:
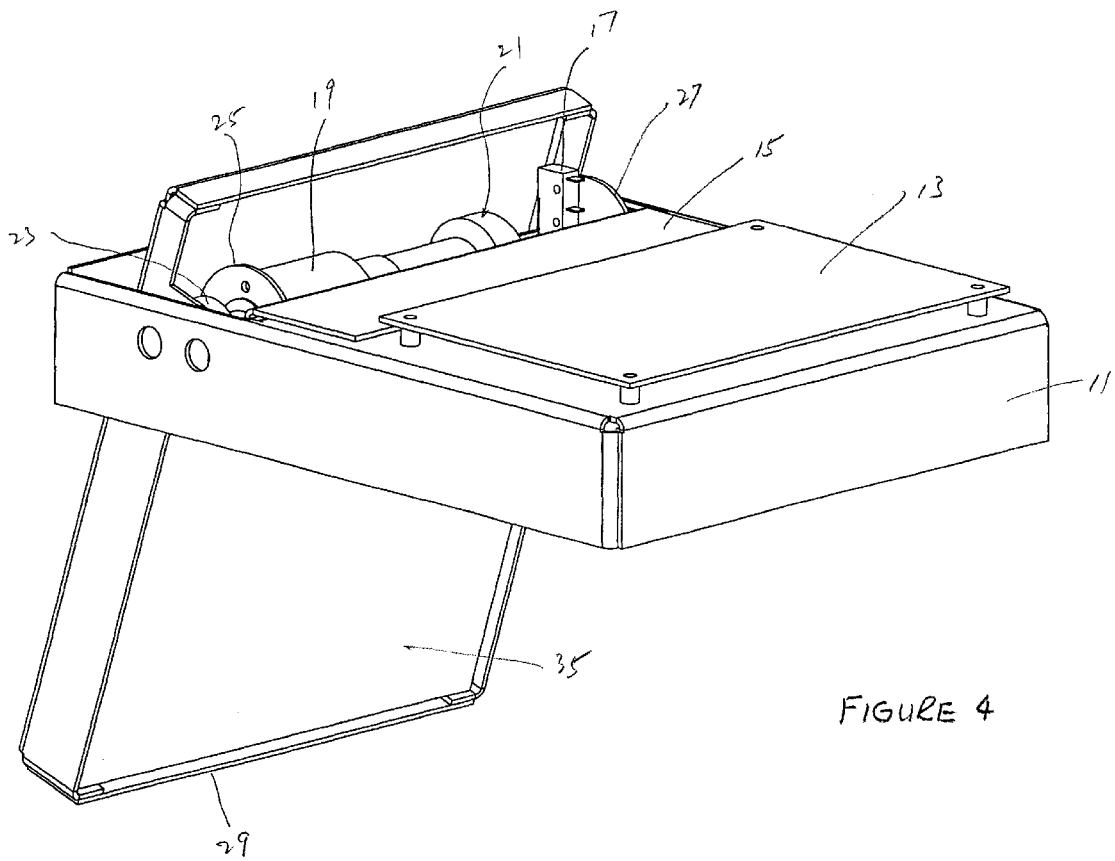
FIG. 4 is a prospective view of the device of FIG. 1 with the flat panel display deployed to its viewing position.

As shown in FIG. 4, when the flat panel monitor 29 is deployed, the LCD screen 35 is brought into viewing position by pivoting the flat panel monitor in a counter-clockwise direction until the positioning switch senses a full deployed position and stops the motion.

An alternate embodiment for mounting the D.C. motor with respect to the flat panel monitor may be utilized wherein the D.C. motor is mounted onto the LCD flat panel monitor which is rotatable within the frame housing 11 and the motor shaft is mounted directly to the frame housing by the coupler 27. The frame housing 11 being stationary, when the D.C. motor rotates, the shaft will remain stationary but the motor housing will rotate about its shaft causing the flat panel monitor to rotate within the frame. The weight of the motor mounted on the flat panel monitor acts as a flywheel inertia.

Figure 5:
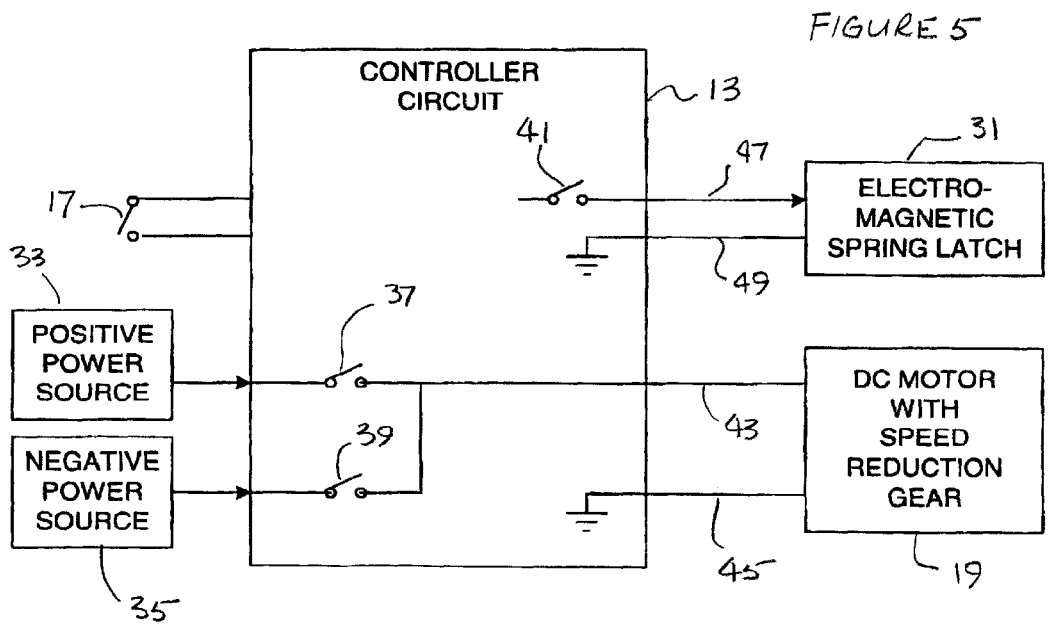
FIG. 5 is a block diagram of a control circuit and the elements of the display it controls.

FIG. 5 illustrates the controller circuit 13 which is mounted on the frame for the flat panel monitor. Controller circuit 13 controls the deployed position switch 17, the electromagnetic spring latch 31, and the D.C. motor 19. Controller circuit 13 also draws from a positive power source 33 and a negative power source 35 to supply to the D.C. motor 19 and the electrical components, as required. A positive power source is supplied to the D.C. motor 19 by closing deploy switch 37. When this switch is closed, the positive power source is supplied to the high side of D.C. motor 19 causing the motor shaft to rotate in a forward or counter-clockwise direction deploying the flat panel monitor 29 to its viewing position. Providing a negative power source 35 to the D.C. motor 19 by closing a stow switch 39 causes the motor shaft to rotate in a clockwise direction to retract the flat panel monitor 29 to its stowed position.

The deployed position switch 17 terminates the power source to the D.C. motor when the flat panel monitor 29 reaches it fully deployed position. The switching operations in the controller circuit can be accomplished by electromechanical relays, solid state devices, or transistors, for example. A latch control switch 41 controls an electromagnetic spring latch 31 which holds the flat panel monitor in its stowed position and will not allow it to be moved to a viewing position unless the latch is released. Closing latch control switch 41 powers the electromagnetic spring latch 31 causing it to retract the spring mechanism to allow the flat panel monitor 29 to move to its deployed viewing position. When the flat panel monitor 29 is retracted into its stowed position, electromagnetic spring latch 31 will snap into its locked position by spring action to hold flat panel monitor 29 in its stowed position.

In the embodiment wherein the D.C. motor is mounted to the frame 11 and the D.C. motor shaft is mounted directly to the flat panel monitor by the coupler 23, when the shaft of the D.C. motor rotates, the panel monitor will rotate. The flat panel monitor is deployed to its fully viewing position when the controller circuit 13 energizes the electromagnetic spring latch 31 to release the flat panel monitor. The control circuit also turns on the positive power source 33 which drives the D.C. motor in a forward or counter-clockwise direction. Because the motor shaft is directly coupled to the flat panel monitor, the monitor will rotate as the motor shaft turns in the forward direction. When the monitor reaches the proper viewing position, the deploy switch 17 senses it causing the control circuit 13 to shut off the positive power source, and the power to the electromagnetic spring latch 31. The control circuit 13 will continue to provide a small amount of current to the D.C. motor to hold the flat panel monitor in the deployed position.

To stow the flat panel monitor from its fully deployed position, the control circuit 13 will turn on the negative power source 35 to the D.C. motor 19 driving the D.C. motor in a reverse or clockwise direction. This causes the flat panel monitor to pivot as the shaft turns in the reverse direction. When the flat panel monitor is in its fully stowed position, the position switch 17 will shut off the negative power source. The spring action of the electromagnetic spring latch 31 which is not energized locks the flat panel monitor into its stowed position.

During power failure, when the flat panel monitor is in its fully deployed viewing position, the controller 31 sends a high voltage pulse to the D.C. motor. The length of the voltage pulse will depend upon the particular D.C. motor used and the weight of the flat panel monitor. This high voltage pulse drives the D.C. motor to spin in a clockwise direction at high speed causing the flywheel 21 to also spin at a high speed, storing inertial energy. When power to the controller is terminated, the inertial energy stored in the spinning flywheel will bring the flat panel monitor back to its stowed position with the electromagnetic spring latch 31 locking the panel into its stowed position.

What is claimed is:

1. A stowable flat panel monitor, comprising:
   a frame for mounting to a stationary object;
   a flat panel monitor mounted to the frame for pivoting through an arc, between a stowed position wherein the monitor is within the frame, and a deployed position wherein the monitor is at a viewing position;
   a motor mounted directly between the frame and the monitor, the motor being capable of being driven in a first direction and a second direction; and
   a control circuit for driving the motor in a first direction and a second direction, said control circuit connected for sensing failure of a main power source and driving the motor in the second direction in response;
   whereby driving the motor in a first direction causes the monitor to deploy to a viewing position and driving the motor in a second direction causes the monitor to move into a stowed position within the frame.

2. The stowable flat panel monitor of claim 1 further comprising a deployed position switch for stopping the motor when the monitor is deployed in its viewing position.

3. The stowable flat panel monitor of claim 1 wherein said motor has a rotating shaft, and further comprising:
   a flywheel mounted to the shaft of the motor.

4. The stowable flat panel monitor of claim 3 wherein the motor is mounted to the flat panel monitor and the shaft is mounted directly to the stationary frame.

5. The stowable flat panel monitor of claim 3 wherein the motor housing is mounted directly to the stationary frame and the motor shaft is mounted directly to the flat panel monitor.

6. The stowable flat panel monitor of claim 5 further comprising:
   a flywheel mounted to the shaft of the motor.

7. The stowable flat panel monitor of claim 1 wherein the motor is a D.C. motor and the control circuit drives the D.C. motor in the first direction by supplying it a positive voltage, and in the second direction by supplying it a negative voltage.

8. The stowable flat panel monitor of claim 7 wherein the control circuit drives the D.C. motor in the second direction by supplying it a negative voltage pulse whenever a power failure is imminent in order to move the monitor into a stowed position within the frame even after power is lost.

9. The stowable flat panel monitor of claim 1 further comprising an electromagnetic latch for holding the monitor in its stowed position until released.

10. A stowable flat panel monitor, comprising:
    a frame for mounting to a stationary object;
    a flat panel monitor mounted to the frame for pivoting through an arc, from a stowed position wherein the monitor is within the frame, and a deployed position wherein the monitor is at a viewing position;

a motor in a housing having a shaft, the motor fastened between the frame and the monitor by the motor housing and shaft, the motor shaft when driven in a first direction causing the monitor to pivot to a viewing position and when driven in a second direction causing the monitor to pivot into a stowed position within the frame; and a control circuit for driving the motor and shaft in a first direction and a second direction, said control circuit connected for sensing failure of a main power source and supplying a pulse to the motor to rotate the motor shaft in a second direction.

11. The stowable flat panel monitor of claim 10 wherein the motor housing is mounted to the flat panel monitor and the motor shaft is mounted to the stationary frame.

12. The stowable flat panel monitor of claim 10 wherein the motor is a D.C. motor and the control circuit drives the D.C. motor shaft in the first direction by supplying it a positive voltage, and in the second direction by supplying it a negative voltage.

13. The stowable flat panel monitor of claim 12 wherein the control circuit drives the D.C. motor and rotates the shaft in the second direction by supplying the D.C. motor with a negative voltage pulse whenever a power failure is imminent in order to drive the motor shaft to move the monitor into a stowed position within the frame even after power is lost.

14. The stowable flat panel monitor of claim 10 further comprising a deployed position switch for stopping the motor when the monitor is deployed in its viewing position.

15. The stowable flat panel monitor of claim 10 further comprising an electromagnetic latch for holding the monitor in its stowed position until released.

16. The stowable flat panel monitor of claim 10 wherein the motor housing is mounted to the stationary frame and the motor shaft is mounted to the flat panel monitor.

17. The stowable flat panel monitor of claim 16 further comprising:

a flywheel mounted to the motor shaft.

18. The stowable flat panel monitor of claim 10 further comprising:

a flywheel mounted to the shaft of the motor between the frame and monitor.

* * * * *